(No Model.)

E. MEHNER.
GEOMETRICAL PUZZLE.

No. 260,594. Patented July 4, 1882.

Witnesses:

Inventor:
Edmund Mehner
By Jas. B Erwin
Attorney.

UNITED STATES PATENT OFFICE.

EDMUND MEHNER, OF MILWAUKEE, WISCONSIN.

GEOMETRICAL PUZZLE.

SPECIFICATION forming part of Letters Patent No. 260,594, dated July 4, 1882.

Application filed March 30, 1882. (No model.)

*To all whom it may concern:*

Be it known that I, EDMUND MEHNER, a citizen of the United States, residing at Milwaukee, in the county of Milwaukee and State of Wisconsin, have invented certain new and useful Improvements in Geometrical Puzzles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in puzzles.

The object of my invention is, first, to provide a certain number of blocks of such shapes that they may be united at their edges to produce a great variety of symmetrical figures, which figures are changed by changing the relative arrangement of said blocks to each other; second, to provide a chart representing a variety of figures which may be formed by uniting the blocks in the various relative positions to each other.

Figure 1:
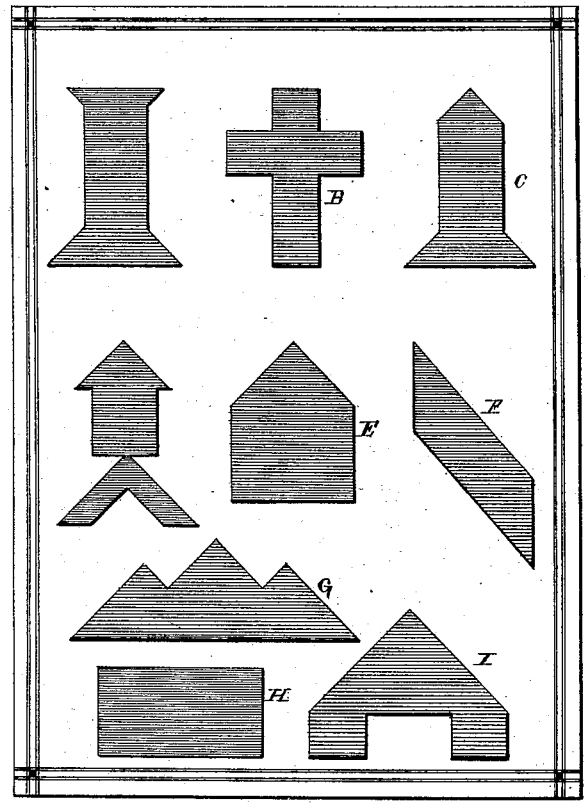
Figure 2:
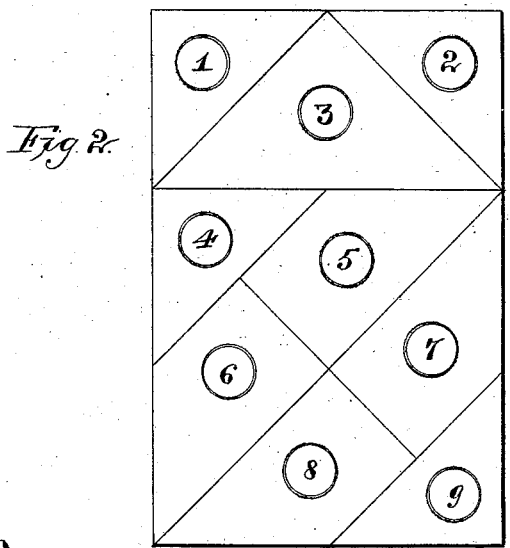

My invention is further explained by reference to the accompanying drawings, in which Figure 1 is a chart illustrating the various figures which my peculiar-shaped blocks are adapted to form. Fig. 2 represents my peculiar-shaped blocks, showing their various shapes and relative sizes.

Each of the figures A B C D E F G H I shown in the chart is composed of the same number of blocks. All of the nine blocks shown in Fig. 2 are embodied in each of said figures. The chart presents before the player the outline only of the figures to be formed from the blocks.

The puzzle consists in divining how the blocks must be placed in contact with each other to form such figures without using more or less than all of the blocks shown. In solving the puzzle the blocks are first arranged promiscuously upon a table, when one figure of the chart after another may be selected as the pattern of the figures to be formed by the blocks. The blocks from 1 to 9 respectively are preferably made of card-board or other thin material.

The chart shown may be printed upon card-board, or, if desired, upon the cover of the box or receptacle for the blocks.

Having thus described my invention, what I claim as new, and desire to secure by Letters Patent, is—

1. In puzzles, the chart herein described, provided with the various symmetrically-shaped figures illustrated thereon, substantially as and for the purpose specified.

2. In puzzles, the peculiar-shaped movable blocks represented by figures from 1 to 9, respectively, said blocks being of the same relative sizes shown, substantially as and for the purpose set forth.

3. The puzzle herein described, consisting of the movable blocks of the shapes and relative sizes shown, and the chart representing the various symmetrical figures which said blocks are adapted to form, substantially as set forth.

In testimony whereof I affix my signature in presence of two witnesses.

EDMUND MEHNER.

Witnesses:
JAS. B. ERWIN,
L. PFEIT.